US012765515B2

(12) United States Patent
Vickers

(10) Patent No.: US 12,765,515 B2
(45) Date of Patent: Oct. 20, 2026

(54) HARNESS FOR SAFE ANIMAL RETENTION

(71) Applicant: Half-Pint Pet Products, LLC, Matthews, NC (US)

(72) Inventor: Julie Vickers, Matthews, NC (US)

(73) Assignee: Half-Pint Pet Products, LLC, Charlotte, NC (US)

( * ) Notice: Subject to any disclaimer, the term of this patent is extended or adjusted under 35 U.S.C. 154(b) by 55 days.

(21) Appl. No.: 18/948,636

(22) Filed: Nov. 15, 2024

(65) Prior Publication Data

US 2026/0137061 A1 May 21, 2026

(51) Int. Cl.
*A01K 15/00* (2006.01)
*A01K 27/00* (2006.01)

(52) U.S. Cl.
CPC .......... *A01K 15/006* (2013.01); *A01K 27/002* (2013.01)

(58) Field of Classification Search
CPC .. A01K 15/006; A01K 27/002; A01K 27/008; A01K 13/006; A01K 15/04
See application file for complete search history.

(56) References Cited

U.S. PATENT DOCUMENTS 3,115,867 A * 12/1963 Meyerotto ........... A01K 15/006 119/761
4,036,179 A * 7/1977 Turner ................. A01K 13/006 119/815
5,184,762 A * 2/1993 Nevitt .................. A01K 27/002 119/858
5,746,158 A 5/1998 Landherr
5,894,817 A * 4/1999 Manuel .................. A01K 1/029 119/497
5,924,388 A * 7/1999 Peeples .................. A01K 15/02 119/814
6,367,424 B1 4/2002 Higham
6,463,887 B1 10/2002 Thomas
6,659,824 B1 * 12/2003 McCormick ............ B63C 9/125 441/106
7,559,817 B2 * 7/2009 Von Zell .............. A01K 13/006 441/123

(Continued)

FOREIGN PATENT DOCUMENTS

DE 202024106483 U1 * 11/2024 ........... A01K 29/005
KR 20230001346 A * 1/2023 ........... A01K 13/007

(Continued)

*Primary Examiner* — Monica L Perry
(74) *Attorney, Agent, or Firm* — Clements Bernard Walker; Devin Cummins

(57) ABSTRACT

A device for retaining an animal within an enclosure includes a harness, a left-side cranial retainer, and a right-side cranial retainer. The harness includes one or more flexible materials and is configured to be selectively secured around a body of the animal. The left-side cranial retainer is coupled to the harness and includes a left-side longitudinal member configured such that a longitudinal axis of the left-side longitudinal member is oriented substantially parallel to a dorsal-ventral axis of the animal in use. The right-side cranial retainer is coupled to the harness and includes a right-side longitudinal member configured such that a longitudinal axis of the right-side longitudinal member is oriented substantially parallel to the dorsal-ventral axis of the animal in use.

16 Claims, 9 Drawing Sheets

501

(56) References Cited

U.S. PATENT DOCUMENTS

| | | | | |
|---|---|---|---|---|
| 7,963,256 | B1 * | 6/2011 | Horgan | A01K 27/002<br>119/816 |
| 8,109,240 | B2 * | 2/2012 | Matusak | A01K 15/04<br>119/758 |
| 8,182,300 | B2 * | 5/2012 | Cosson | B63C 9/115<br>441/123 |
| D828,648 | S | 9/2018 | Cook | |
| 10,383,313 | B2 | 8/2019 | Bartol | |
| 12,156,511 | B1 * | 12/2024 | Coley | A01K 27/002 |
| 2002/0121248 | A1 | 9/2002 | Rooks | |
| 2012/0090558 | A1 * | 4/2012 | Matusak | A01K 15/04<br>119/758 |
| 2015/0289484 | A1 | 10/2015 | Codos et al. | |
| 2017/0006834 | A1 * | 1/2017 | Waters | A01K 27/002 |
| 2020/0237066 | A1 * | 7/2020 | Lin | A45C 9/00 |
| 2022/0408891 | A1 * | 12/2022 | Lin | A01K 27/008 |

FOREIGN PATENT DOCUMENTS

| | | | | |
|---|---|---|---|---|
| WO | WO-2013084841 | A1 * | 6/2013 | A01K 27/002 |
| WO | WO-2018147022 | A1 * | 8/2018 | A01K 27/00 |

* cited by examiner

101

201

301

401

501

801

901

HARNESS FOR SAFE ANIMAL RETENTION

TECHNICAL FIELD

The present disclosure relates generally to the field of retention devices for pets and animal husbandry. More particularly, the present disclosure relates to a harness for retaining an animal within an enclosure with increased safety.

BACKGROUND

Many pet owners and monitors for other animals such as livestock set up enclosures such as fences, gates, balcony rails, and the like to keep the animal within an associated enclosed area for both the protection of the animal and the surrounding environment, surrounding people, surrounding animals, etc. However, many enclosures are not adequate to retain the animal within the enclosure depending on the configuration of the enclosure (e.g., the provided spacing between posts, sections, and the like) or the characteristics of the animal (e.g., size, weight, height, width, intelligence, and the like). Furthermore, even if the characteristics of an animal prevent the animal from slipping between vertical posts or the like, current enclosures do nothing to prevent a small animal from squeezing under such an enclosure or to prevent an animal from digging under the enclosure to escape the enclosed area.

Lines, tethers, and the like may be secured between the animal and a fixed structure, foundation, etc., but such tethering of the animal severely limits the freedom of the animal, which may be undesirable or even unethical or illegal depending on the situation (e.g., length of time spent tethered and/or accessibility to food and water). Furthermore, current enclosures and teethers do nothing to decrease the risks of water hazards within the enclosed area or accessible area. For example, pets may be injured or even drown within pools, ponds, and the like within the enclosed area or accessible area of the animal.

As such, a need exists in the art for a device that overcomes the above limitations.

This background is provided as an illustrative contextual environment only. It will be readily apparent to those of ordinary skill in the art that the systems and methods of the present disclosure may be implemented in other contextual environments as well.

SUMMARY

Therefore, it is an object of the present disclosure to provide a device for retaining an animal within an enclosure that overcomes the limitations of the known art.

Embodiments of the disclosed device include opposing left and right-side cranial retainers to prevent the animal from escaping an enclosure. The cranial retainers are secured and oriented relative to the animal utilizing a harness including one or more flexible materials, fabrics, straps, and the like. The cranial retainers each include a longitudinal member oriented substantially vertical when the device is in use, e.g., worn by and properly secured to the animal. Various embodiments of the cranial retainers are sized and shaped and each coupled to the harness at two vertically displaced locations such that the animal is prevented from slipping between posts of an enclosure. Such disclosed embodiments may prevent an intelligent animal from manipulating the cranial retainers through the posts to allow the animal to escape. Various embodiments of the cranial retainers may have a vertical height of at least 4 inches and/or may extend vertically lower than the lowest point of the harness, when worn, to prevent the animal from squeezing under or digging under the enclosure, or at least extend the time required for the animal to dig or squeeze under the enclosure.

In at least some embodiments, the cranial retainers may further function as floatation devices. The cranial retainers configured to prevent escape from the enclosure, as described above, also provide floatation assistance that allows the animal to swim in a natural fashion to escape any water hazard within the enclosure. For example, geometric centers of buoyant cranial retainers positioned and fixed within each of a back portion of the harness, a bottom portion of the harness, and respective left-side and right-side portion of the harness may promote keeping the head of the animal above water without altering a natural orientation of the animal for swimming.

To achieve the foregoing and other objects and advantages, in one aspect, the present subject matter is directed to a device for retaining an animal including a harness, a left-side cranial retainer, and a right-side cranial retainer. The harness includes one or more flexible materials and is configured to be selectively secured around a body of the animal. The left-side cranial retainer is coupled to the harness and includes a left-side longitudinal member configured such that a longitudinal axis of the left-side longitudinal member is oriented substantially parallel to a dorsal-ventral axis of the animal in use. The right-side cranial retainer is coupled to the harness and includes a right-side longitudinal member configured such that a longitudinal axis of the right-side longitudinal member is oriented substantially parallel to the dorsal-ventral axis of the animal in use.

In at least one embodiment, the device may further include a ventral-side cranial retainer coupled to the harness and including a ventral-side longitudinal member configured such that a longitudinal axis of the ventral-side longitudinal member is oriented substantially perpendicular to a lateral-medial axis of the animal in use. Additionally or alternatively, the longitudinal axis of the ventral side longitudinal member of the ventral-side cranial retainer may be oriented predominantly along a cranial-caudal axis of the animal in use.

In an additional or alternative embodiment, the harness may be configured to define a front portion opposite a back portion, a top portion opposite a bottom portion, and a left-side portion opposite a right-side portion. Additionally or alternatively, each of the left-side cranial retainer and the right-side cranial retainer may be coupled to the harness at a location within each of the back portion of the harness, the top portion of the harness, and the respective left-side portion or right-side portion of the harness. Furthermore or in different embodiments, each of the left-side cranial retainer and the right-side cranial retainer may be further coupled to the harness at a further location within each of the back portion of the harness, the bottom portion of the harness, and the respective left-side portion or right-side portion of the harness. Additionally or alternatively, each of the left-side cranial retainer and the right-side cranial retainer may be continuously coupled to the harness from the respective location to the respective further location. In some such embodiments or different embodiments, a geometric center of each of the left-side cranial retainer and the right-side cranial retainer may be positioned within each of the back portion of the harness, the bottom portion of the harness, and the respective left-side portion or right-side portion of the harness.

In an additional or alternative embodiment, each of the left-side longitudinal member and the right-side longitudinal member may include at least one of a foam material, an inflatable bladder, or an air bladder. In some such embodiment or different embodiments, each of the left-side cranial retainer and the right-side cranial retainer may be embedded within the harness. Additionally or alternatively, each of the left-side longitudinal member and the right-side longitudinal member may include a sealable, nonpermeable internal bladder. In some such embodiments, the internal bladder of the left-side longitudinal member may be fluidly coupled with the internal bladder of the right-side longitudinal member.

In at least some embodiments, each of the left-side longitudinal member and the right-side longitudinal member may define a longitudinal length of at least four inches along its respective longitudinal axis. Additionally or alternatively, each of the left-side longitudinal member and the right-side longitudinal member may define a longitudinal length greater than a height of the harness in use. In some such embodiments or different embodiments, each of the left-side longitudinal member and the right-side longitudinal member may extend vertically lower than a lowest point of the harness, in use. In an additional or alternative embodiment, each of the left-side longitudinal member and the right-side longitudinal member may define a ratio of a widest width perpendicular to the respective longitudinal axis over a longitudinal length along the respective longitudinal axis between 0.48 and 0.88.

Furthermore or alternatively, each of the left-side cranial retainer and the right-side cranial retainer may define a cavity extending through the respective left-side longitudinal member or the right-side longitudinal member and along the respective longitudinal axis. Additionally or alternatively, the device may further include a left-side retention strap received within the cavity defined through the left-side longitudinal member. The left-side retention strap may include opposing ends each separately coupled to the harness. In an additional or alternative embodiment, the device may further include a right-side retention strap received within the cavity defined through the right-side longitudinal member. The right-side retention strap may include opposing ends each separately coupled to the harness. In additional or alternative embodiments, the left-side retention strap may include a first end fixed to the harness and an opposing second end. The right-side retention strap may include a first end fixed to the harness and an opposing second end. In some such embodiments or alternative embodiments, the second end of the right-side retention strap and the second end of the left-side retention strap may be configured to selectively couple together to secure the animal to the device, in use.

In an additional or alternative aspect, the present subject matter is directed to a device for retaining an animal including a harness, a left-side cranial retainer, and a right-side cranial retainer. The harness includes one or more flexible materials and defines a front portion opposite a back portion, a top portion opposite a bottom portion, and a left-side portion opposite a right-side portion. The harness is to be selectively secured around a body of the animal. The left-side cranial retainer is coupled to the harness at a location within each of the back portion of the harness, the top portion of the harness, and the left-side portion of the harness and at a further location within each of the back portion of the harness, the bottom portion of the harness, and the left-side portion of the harness. The left-side cranial retainer includes a left-side longitudinal foam member configured such that a longitudinal axis of the left-side longitudinal foam member is oriented substantially parallel to a dorsal-ventral axis of the animal in use. The left-side longitudinal foam member defines a longitudinal length of at least four inches along its longitudinal axis and such that the left-side longitudinal foam member defines a ratio of a widest width perpendicular to its longitudinal axis over the longitudinal length between 0.48 and 0.88. The right-side cranial retainer is coupled to the harness at a location within each of the back portion of the harness, the top portion of the harness, and the right-side portion of the harness and at a further location within each of the back portion of the harness, the bottom portion of the harness, and the right-side portion of the harness. The right-side cranial retainer includes a right-side longitudinal foam member configured such that a longitudinal axis of the right-side longitudinal foam member is oriented substantially parallel to the dorsal-ventral axis of the animal in use. The right-side longitudinal foam member defines a longitudinal length of at least four inches along its longitudinal axis and such that the right-side longitudinal foam member defines a ratio of a widest width perpendicular to its longitudinal axis over the longitudinal length between 0.48 and 0.88.

In at least one embodiment, the device may further include a ventral-side cranial retainer coupled to the harness at a location within each of the front portion of the harness and the bottom portion of the harness and at a further location within each of the back portion of the harness and bottom top portion of the harness. The ventral-side cranial retainer may include a ventral-side longitudinal foam member configured such that a longitudinal axis of the ventral-side longitudinal foam member is oriented substantially perpendicular to a lateral-medial axis of the animal in use and predominantly along a cranial-caudal axis of the animal in use.

Additionally or alternatively, each of the left-side cranial retainer and the right-side cranial retainer may define a cavity extending through the respective left-side longitudinal foam member or the right-side longitudinal foam member and along the respective longitudinal axis. The device may further include a left-side retention strap received within the cavity defined through the left-side longitudinal foam member. The left-side retention strap may include a first end fixed to the harness and an opposing second end. The device may also include a right-side retention strap received within the cavity defined through the right-side longitudinal foam member. The right-side retention strap may include a first end fixed to the harness and an opposing second end. The second end of the right-side retention strap and the second end of the left-side retention strap may be configured to either selectively couple together to secure the animal to the device, in use, or separately couple to the harness.

In an additional or alternative aspect, the present subject matter is directed to a device for retaining an animal including a harness, a left-side dorsal retainer, and a right-side dorsal retainer. The harness includes one or more flexible materials and is configured to be selectively secured around a body of the animal. The left-side dorsal retainer is coupled to the harness and includes a left-side longitudinal member configured such that a longitudinal axis of the left-side longitudinal member is oriented substantially parallel to a cranial-caudal axis of the animal in use. The right-side dorsal retainer is coupled to the harness and includes a right-side longitudinal member configured such that a longitudinal axis of the right-side longitudinal member is oriented substantially parallel to the cranial-caudal axis of the animal in use.

Embodiments of the invention can include one or more or any combination of the above features and configurations.

Additional features, aspects, and advantages of the invention will be set forth in the detailed description of illustrative embodiments that follows, and in part will be readily apparent to those skilled in the art from that description or recognized by practicing the invention as described herein. It is to be understood that both the foregoing general description and the following detailed description present various embodiments of the invention and are intended to provide an overview or framework for understanding the nature and character of the invention as it is claimed. The accompanying drawings are included to provide a further understanding of the invention and are incorporated in and constitute a part of this specification.

BRIEF DESCRIPTION OF THE DRAWINGS

A full and enabling disclosure of the present invention, including the best mode thereof, directed to one of ordinary skill in the art, is set forth in the specification, which makes reference to the companying drawings, in which.

Figure 1A:
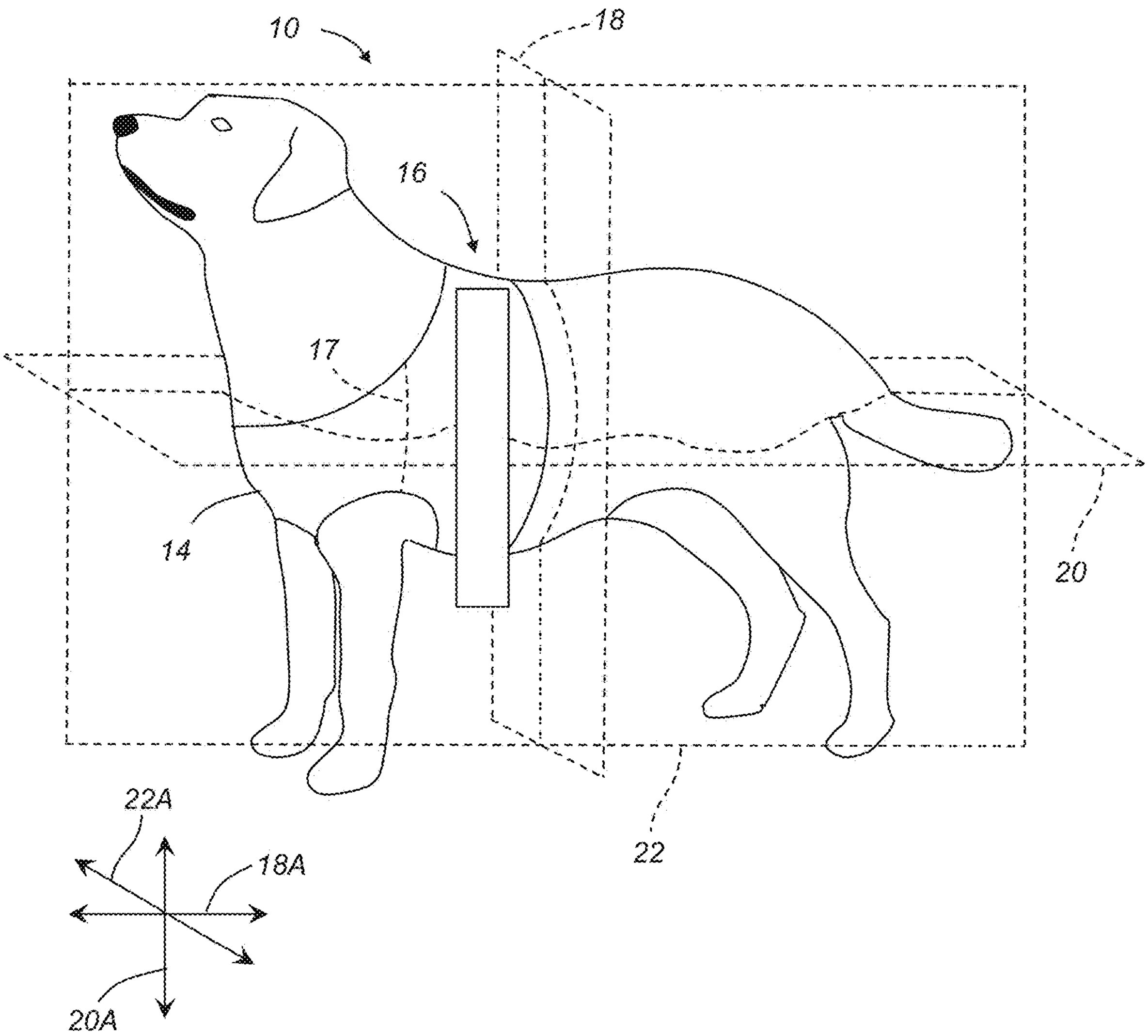
FIG. 1A illustrates a schematic diagram of an exemplary embodiment of a device for retaining an animal within an enclosure, in accordance with aspects of the present subject matter.

It will be readily apparent to those of ordinary skill in the art that aspects of illustrated embodiments may be used in any desired combinations, without limitation. Repeat use of reference characters in the present specification and drawings is intended to represent the same or analogous features or elements of the present invention.

DETAILED DESCRIPTION

The present invention will now be described more fully hereinafter with reference to the accompanying drawings in which exemplary embodiments of the invention are shown. However, the invention may be embodied in many different forms and should not be construed as limited to the representative embodiments set forth herein. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. It is envisioned that other embodiments may perform similar functions and/or achieve similar results. Any and all such equivalent embodiments and examples are within the scope of the present invention and are intended to be covered by the appended claims.

The exemplary embodiments are provided so that this disclosure will be both thorough and complete and will fully convey the scope of the invention and enable one of ordinary skill in the art to make, use, and practice the invention. The word "exemplary" is used herein to mean "serving as an example, instance, or illustration." Any implementation described herein as "exemplary" is not necessarily to be construed as preferred or advantageous over other implementations.

The terms "coupled," "fixed," "attached to," "communicatively coupled to," "operatively coupled to," and the like refer to both direct coupling, fixing, attaching, communicatively coupling, and operatively coupling as well as indirect coupling, fixing, attaching, communicatively coupling, and operatively coupling through one or more intermediate components or features, unless otherwise specified herein. "Communicatively coupled to" and "operatively coupled to" can refer to physically and/or electrically related components.

As used herein, the terms "first", "second", and "third" may be used interchangeably to distinguish one component from another and are not intended to signify location or importance of the individual components. The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1B:
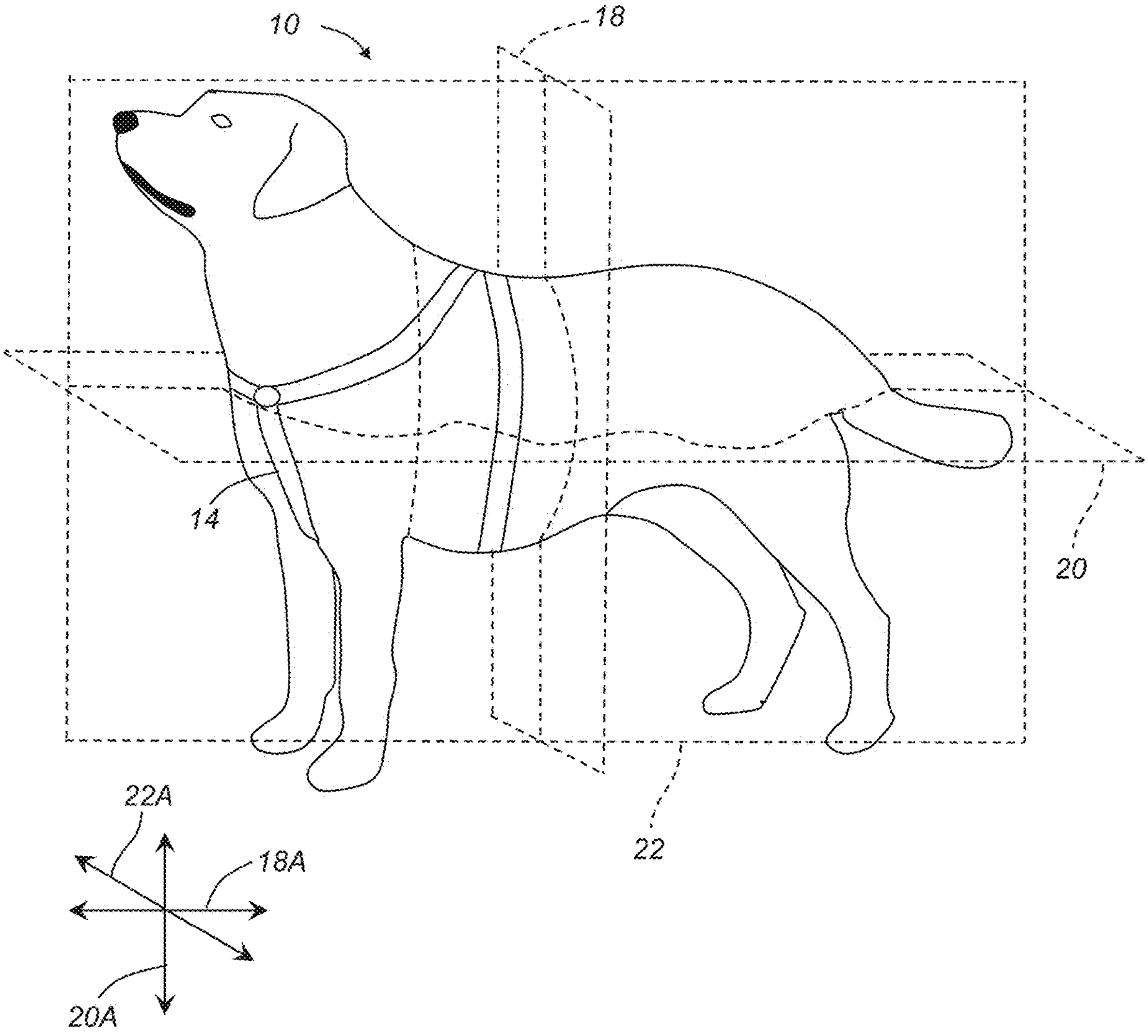
FIG. 1B illustrates a schematic diagram of an exemplary embodiment of a device for retaining an animal within an enclosure including an alternative harness, in accordance with aspects of the present subject matter.

Referring now generally to FIGS. 1A and 1B, schematic diagrams of exemplary embodiments of a device for retaining an animal within an enclosure are illustrated in accordance with aspects of the present subject matter. Particularly, FIGS. 1A and 1B illustrates embodiments of a device 10 for retaining an animal within an enclosure, such as a fenced or gated area or balcony partially enclosed with a rail, by increasing the width and height of the animal in order to prevent the animal from escaping through gaps, spaces, holes, or the like in a suitable enclosure or at least increase the time required for the animal to fully escape. In various embodiments and as shown particularly in FIG. 1A, the device 10 includes a harness 14 and two or more retainers 16 (e.g., a left-side cranial retainer 16A as shown particularly in FIG. 2). It should be appreciated an additional retainer 16 may be coupled to the harness 14 on the opposite side of the harness 14 in FIG. 1A (e.g., a right-side cranial retainer 16B as shown particularly in FIG. 2). It should be appreciated that the retainers 16 are omitted from the embodiment of FIG. 1B in order to clearly show details of the associated harness 14 of the embodiment. Furthermore, various embodiments of the retainers 16 may additionally or alternatively be configured as floatation devices to promote the safety of the animal (e.g., to reduce the risk of drowning).

While the exemplary embodiments of the device are illustrated with respect to a dog, it should be appreciated that the present disclosure is equally applicable to any animal capable of wearing a harness suitable to support the retainers as described herein. For example, the device 10 may be configured for use with cats, rabbits, rodents, personal companions, agricultural animals, service animals, and the like where retention within an enclosure and/or a reduction in the risk of drowning is desired or required.

Referring again generally to FIGS. 1A and 1B, the animal generally defines a cranial-caudal plane 18 perpendicular to a cranial-caudal axis 18A and separating a cranial portion of the animal (e.g., head portion) from a caudal portion of the animal (e.g., tail portion). The animal further defines ventral-dorsal plane 20 perpendicular to a ventral-dorsal axis 20A and the cranial-caudal plane 18. The ventral-dorsal plane 20 separates a ventral portion of the animal (e.g., front or chest portion) from a dorsal portion of the animal (e.g., back portion). The animal also defines a lateral-medial plane 22 perpendicular to a lateral-medial axis 22A and each of the cranial-caudal plane 18 and the ventral-dorsal plane 20. The lateral-medial plane 22 generally separates a right side of the animal from an opposing left side of the animal. The lateral-medial axis 22A may further define a lateral direction (outward from the lateral-medial plane 22) and a medial direction (inward to the lateral-medial plane 22). Various embodiments of the device 10 disclosed herein are described with respect to such designations in order to retain the animal within the enclosure, increase the time required for the animal to escape the enclosure, and/or to reduce the risk of drowning of the animal due to accessible water hazards (pools, lakes, ponds, streams, oceans, etc.).

The device 10 includes a harness 14 capable of being selectively secured around the animal (e.g., one or more of a chest, cranial leg, cranial torso, caudal leg, caudal torso, etc.) and supporting the retainers 16, as described herein. The harness 14 may include one or more flexible materials, such as a fabric (FIG. 1A) or a strap (FIG. 1B). The harness 14 may include a single continuous flexible material or a combination of the same or different flexible materials (straps, fabrics, or the like) suitable to enclose or wrap around portions of the body of the animal. Furthermore, flexible materials of the harness 14 or portions thereof may be permanently secured together (e.g., the center, cranial loop of FIG. 1B; stitched; bonded; or the like) to form the harness 14. In various embodiments, the harness 14 may include one or more closures (e.g., clasps, buckles, zippers, hook-and-loop fasteners, and the like) configured to selectively secure the harness 14 to the animal in use, see e.g., closures 15A and/or 15B of FIG. 4. Embodiments of the harness 14 illustrated and described herein are provided to place the present subject matter in an exemplary field of use, but it should be appreciated that the present disclosure is equally applicable to and/or may be utilized with any harness 14 suitable to support the retainers 16 as described herein. For example, various configurations of harness 14 include additional, fewer, or alternatively placed flexible materials and/or closures as required for the type or harness, type of animal, and/or characteristics of the animal (size, shape, etc.).

Regardless of the particular embodiment of the harness 14, the harness 14 generally defines a front portion opposite a back portion. For example and as shown, portions of the harness 14 forward of the cranial legs (see dotted line 17 of FIGS. 1A and 1B) of the animal along the cranial-caudal axis 18A, in use, may define the front portion of the harness 14, with the remaining portions of the harness 14 aft of the cranial legs along the cranial-caudal axis 18A defining the back portion of the harness 14. Additionally or alternatively, the front portion of the harness 14 may be defined by the front half of the harness 14 along the cranial-caudal axis 18A, and the back portion of the harness 14 may be defined by the back half of the harness 14 along the cranial-caudal axis 18A. The harness 14 may further define a top portion opposite a bottom portion. For instance, portions of the harness 14 positioned above the ventral-dorsal plane 20, in use, may define the top portion of the harness 14, and portions of the harness 14 positioned below the ventral-dorsal plane 20, in use, may define the bottom portion of the harness 14. Additionally or alternatively, the top portion of the harness 14 may be defined by the top half of the harness 14 along the ventral-dorsal axis 20A, and the bottom portion of the harness 14 may be defined by the bottom half of the harness 14 along the ventral-dorsal axis 20A. The harness 14 also defines a left-side portion opposite a right-side portion. For example, portions of the harness 14 positioned left of the lateral-medial plane 22, in use, may define the left-side portion of the harness 14, and portions of the harness 14 positioned right of the lateral-medial plane 22, in use, may define the right-side portion of the harness 14. Additionally or alternatively, the left-side portion of the harness 14 may be defined by the left half of the harness 14 along the lateral-medial axis 22A, and the right-side portion of the harness 14 may be defined by the right half of the harness 14 along the lateral-medial axis 22A.

Figure 2:
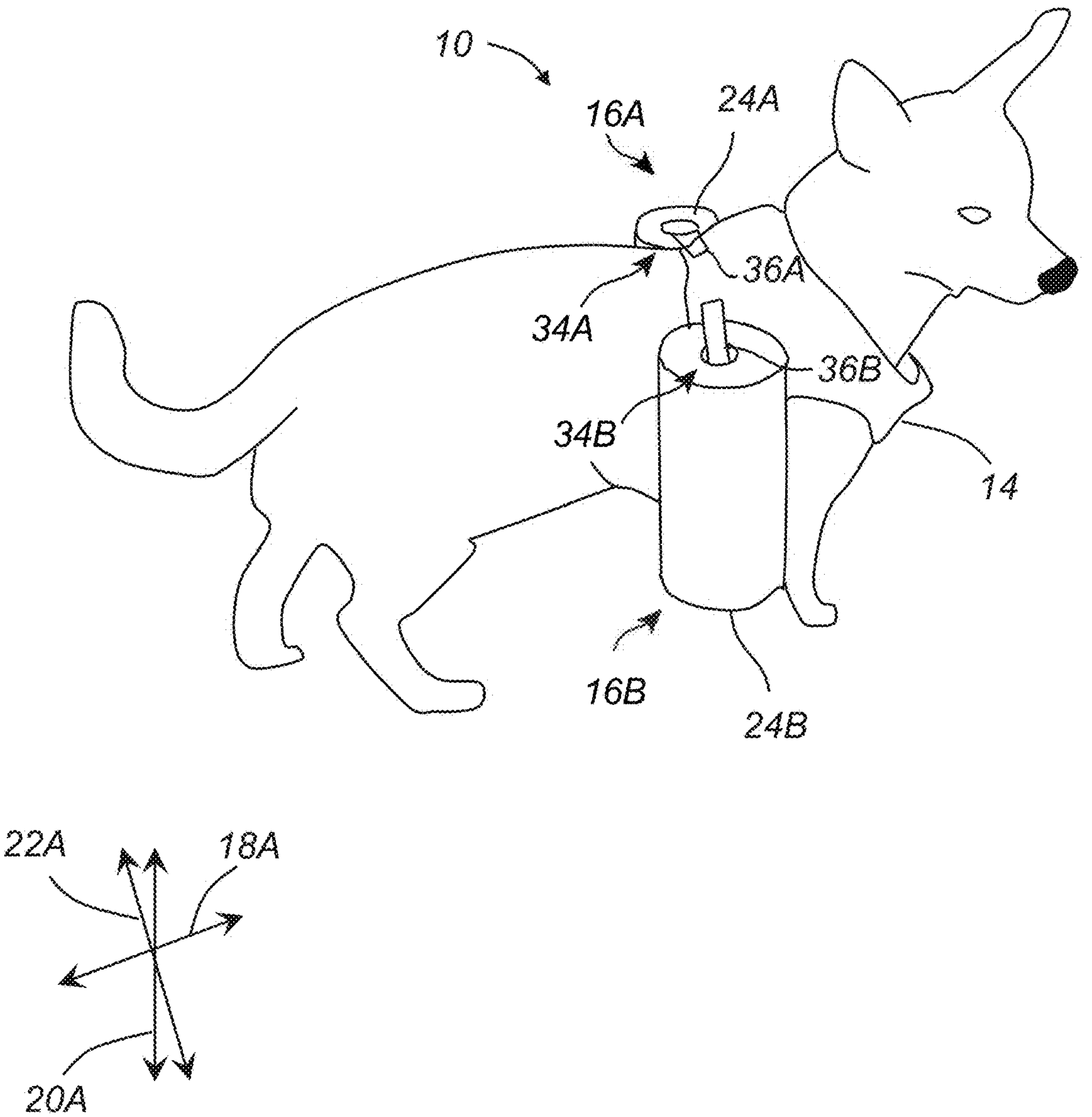
FIG. 2 illustrates a schematic side perspective view of an exemplary embodiment of a device for retaining an animal within an enclosure and in use, in accordance with aspects of the present subject matter.

Referring now to FIG. 2, a side perspective view of an exemplary embodiment of a device for retaining an animal within an enclosure, in use, is illustrated schematically in accordance with aspects of the present subject matter. In the exemplary embodiment, the device 10 includes the harness 14 including a flexible material, as described herein. It should be appreciated that, while the exemplary embodiment of FIG. 2 illustrates a harness 14 including a fabric, the device 10 may be utilized with a harness including one or a combination of flexible materials, straps, fabrics, etc. and/or closures 15 as described with respect to FIGS. 1A and 1B.

As shown, the device 10 includes a left-side cranial retainer 16A coupled to the harness 14. The left-side cranial retainer 16A includes a left-side longitudinal member 24A arranged such that a longitudinal axis of the left-side longitudinal member 24A is oriented parallel or substantially parallel to the dorsal-ventral axis 20A of the animal in use. The device 10 also includes a right-side cranial retainer 16B coupled to the harness 14. The right-side cranial retainer 16B includes a right-side longitudinal member 24B arranged such that a longitudinal axis of the right-side longitudinal member 24B is oriented parallel or substantially parallel to the dorsal-ventral axis 20A of the animal in use. The longitudinal axes of the longitudinal members 24A, 24B may be oriented substantially parallel to the dorsal-ventral axis 20A due to the shape of the body of the animal. For instance, the sides of the torso and/or chest of the animal may be oriented in the lateral direction with respect to the lateral-medial plane 22 and/or the dorsal-ventral axis 20A due to a rounded body. Thus, longitudinal axes of the longitudinal members 24A, 24B may be oriented within 20 degrees, such as within 10 degrees, such as within 5 degrees of the dorsal-ventral axis 20A. Furthermore, such angle may be defined, at least in part, in a lateral direction with respect to the lateral-medial axis 22A.

Referring still to FIG. 2, the longitudinal members 24A, 24B may define a cylindrical shape, cross-section, or profile, as illustrated. However, it should be appreciated that the longitudinal members 24A, 24B may define any other suitable shape, cross-section, profile, or combination thereof, such as a rectangle(s), polygon(s), cone(s), prism(s), etc. Furthermore, a geometric center of each of the cranial retainer(s) 16A, 16B may be positioned within each of the back portion of the harness 14, the bottom portion of the harness 14, and the respective left-side portion or right-side portion of the harness 14. For example, a geometric center of each of the longitudinal members 24A, 24B may be positioned within each of the back portion of the harness 14, the bottom portion of the harness 14, and the respective left-side portion or right-side portion of the harness 14.

Each of the longitudinal members 24A, 24B may include or be formed from a buoyant material allowing the cranial retainers 16A, 16B to function as floatation devices. For example, each of the longitudinal members 24A, 24B may include or be formed from a foam material; a permanently sealed, nonpermeable internal bladder; a sealable, nonpermeable internal bladder; or the like. Thus, the cranial retainers 16A, 16B may function as floatation devices that not only encourage keeping the mouth of the animal above water but also allow the animal to swim in a natural fashion to escape a water hazard. For example, various embodiments of the cranial retainers 16A, 16B do not prevent or appreciably prevent the ability of the animal to perform natural swimming motions, such as a doggy paddle, and/or do not change or substantially change a natural inclination of the animal with respect to a surface of the water while swimming.

Figure 3:
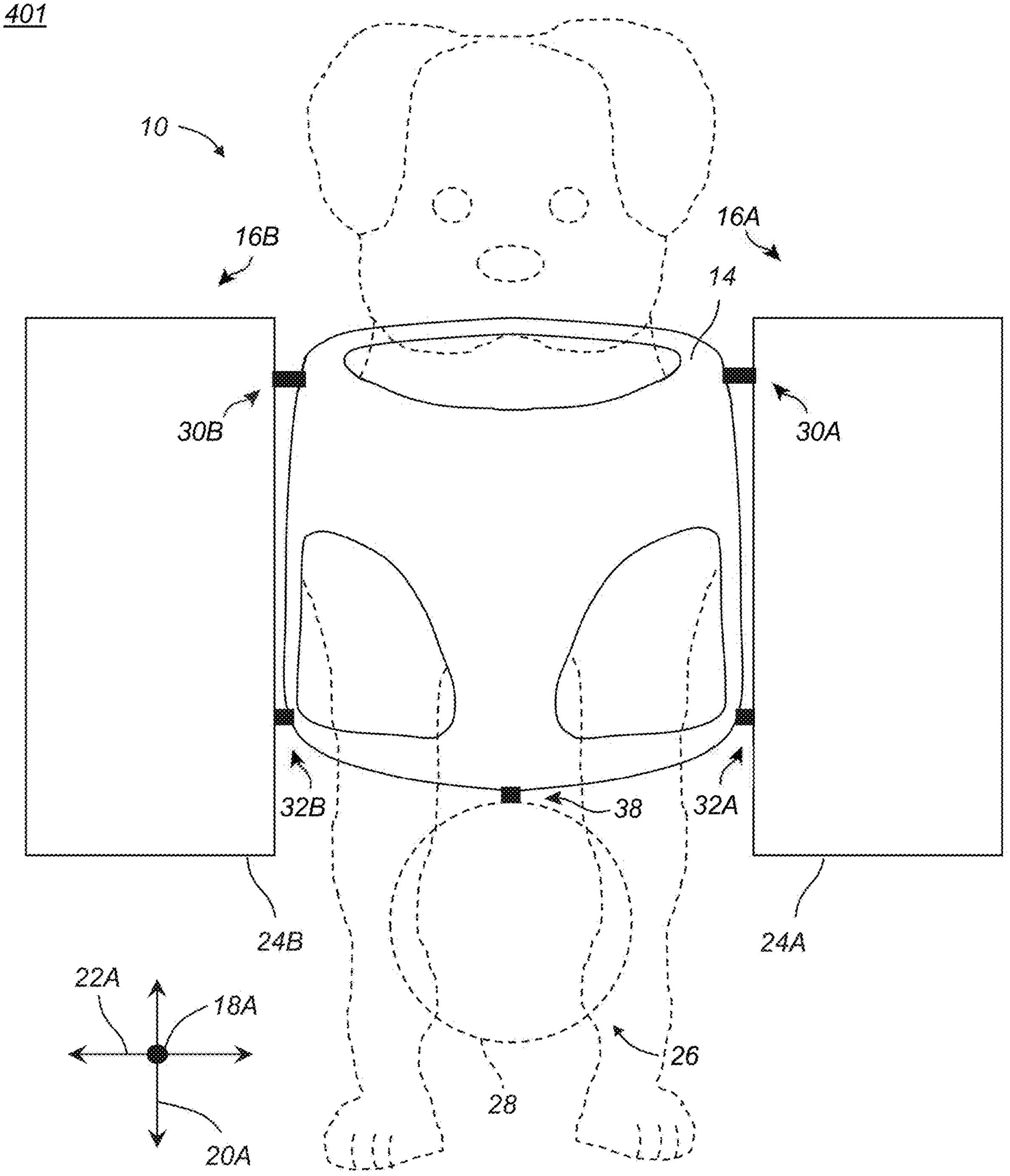
FIG. 3 illustrates a schematic front view of an exemplary embodiment of a device for retaining an animal within an enclosure, in accordance with aspects of the present subject matter.

Referring now to FIG. 3, a front schematic view of an exemplary embodiment of a device for retaining an animal is illustrated in accordance with aspects of the present subject matter. Referring now to FIG. 2 in combination with FIG. 3, each of the cranial retainers 16A, 16B may be coupled to the harness 14 at a first location (30A or 30B of the respective left-side retainer 16A or right-side retainer 16B as shown in FIG. 3) within each of the back portion of the harness 14, the top portion of the harness 14, and the respective left-side portion or right-side portion of the harness 14. Each of the cranial retainers 16A, 16B may be further coupled to the harness 14 at a second location (32A or 32B of the respective left-side retainer 16A or right-side retainer 16B as shown in FIG. 3) within each of the back portion of the harness 14, the bottom portion of the harness 14, and the respective left-side portion or right-side portion of the harness 14. As shown and in some embodiments, each of the cranial retainers 16A, 16B may be discretely coupled to the harness 14 at the first location 30A, 30B and at the second location 32A, 32B. For example, each of the cranial retainers 16A, 16B and/or the longitudinal members 24A, 24B may be stitched, glued, adhered, or otherwise fastened (e.g., via one or more hook-and-loop fasteners) to the harness 14 at each of the first location 30A, 30B and the second location 32A, 32B.

In at least one embodiment and as shown in FIG. 2, each of the cranial retainers 16A, 16B and/or the longitudinal members 24A, 24B may define a cavity (see, e.g., cavity 34A of the left-side longitudinal members 24A and cavity 34B of the right-side longitudinal member 24B). Each cavity 34A, 34B may extend along the longitudinal axis of the respective longitudinal member 24A, 24B. In some such embodiments and as shown, the device 10 may include a retention strap (e.g., left-side retention strap 36A or right-side retention strap 36B) for securing each of the retainers 16A, 16B to the harness 14. For each of the retainers 16A, 16B, the associated retention strap 36A, 36B may be received within the cavity 34A, 34B thereof. The ends of the retention straps 36A, 36B may be separately coupled to the harness 14 to secure the retainers 16A, 16B to the harness 14. For example and as shown, first ends of the retention straps 36A, 36B may be secured to the harness 14 within each of the back portion of the harness 14, the top portion of the harness 14, and the respective left-side portion or right-side portion of the harness 14. While not depicted in FIG. 2, it should be appreciated that opposing second ends of the retention straps 36A, 36B may be secured to the harness 14 within each of the back portion of the harness 14, the bottom portion of the harness 14, and the respective left-side portion or right-side portion of the harness 14.

In additional or alternative embodiments, each of the retainers 16A, 16B may be continuously coupled to the harness 14 from the first location 30A, 30B to the second location 32A, 32B. For example, each of the retainers 16A, 16B may be secured to the harness between the corresponding first location 30A, 30B and the second location 32A, 32B utilizing an adhesive, glue, stitches, tacks, hook-and-loop fasteners, or other suitable fasteners.

Referring still generally to FIGS. 2-3, each of the longitudinal members 24A, 24B may define a longitudinal length (e.g., along the respective longitudinal axis thereof) of at least four inches. Additionally or alternatively, each of the longitudinal members 24A, 24B may define a longitudinal length greater than a height of the harness 14 in use, e.g., a height along the ventral-dorsal axis 20A. For example, each of the longitudinal members 24A, 24B may extend vertically (e.g., along the ventral-dorsal axis 20A) lower than a lowest point of the harness 14 in use.

The longitudinal members 24A, 24B may each define a widest width perpendicular to its respective longitudinal axis (e.g., along the lateral-medial axis 22A) in use. Furthermore, the longitudinal members 24A, 24B may each define a ratio of the widest width perpendicular to its respective longitudinal axis (and/or the widest width along the lateral-medial axis 22A) over the longitudinal length along the respective longitudinal axis between 0.48 and 0.88, such as between 0.53 and 0.83, such as between 0.58 and 0.78, such as between 0.63 and 0.73. Furthermore, the harness 14 may define a widest width in use, e.g., a widest width along the lateral-medial axis 22A. In some embodiments or different embodiments, a ratio of the widest width of each of the longitudinal members 24A, 24B (and/or the widest width along the lateral-medial axis 22A) over the widest width of the harness 14 may be 0.5 or more.

Referring now particularly to FIG. 3, some embodiments of the device 10 may include a ventral-side cranial retainer 26 coupled to the harness 14. The ventral-side cranial retainer 26 includes a ventral-side longitudinal member 28 (depicted in phantom in FIG. 3) having a longitudinal axis oriented substantially perpendicular to the lateral-medial axis 22A of the animal in use. Furthermore, the longitudinal axis of the ventral side longitudinal member 28 of the ventral-side cranial retainer 16 may be oriented predominantly along the cranial-caudal axis 18A of the animal in use. The ventral-side cranial retainer 26 may be coupled to the harness 14 at a first location 38 within each of the front portion of the harness and the bottom portion of the harness 14. The ventral-side cranial retainer 26 may be further coupled to the harness 14 at a second location 40 (not shown) within each of the back portion of harness 14 and the bottom portion of the harness 14. Similar to the cranial retainers 16A, 16B describe above, the ventral-side cranial retainer 26 may be discreetly coupled to the harness at the first and second locations 38, 40 and/or continuously coupled to the harness 14 from the first location 38 to the second location 40.

It should be appreciated that the center of the torso and/or chest of the animal may be oriented in the dorsal direction with respect to the cranial-caudal plane 18 and/or the cranial-caudal axis 18A due to a rounded body. This may be especially true of certain species of animal and/or breeds thereof. For example, pugs generally have a chest and torso which defines a larger angle with respect to the cranial-caudal axis 18A compared to other animals and/or canine breeds. Thus, the longitudinal axis of the ventral-side longitudinal member 28 may be oriented within 45 degrees, such as within 30 degrees, such as within 20, such as within 10 degrees of the cranial-caudal axis 18A. Furthermore, such angle may be defined, at least in part, in a dorsal direction with respect to the dorsal-ventral plane 20 and/or cranial-caudal axis 18A. The ventral-side longitudinal member 28 may define a cylindrical shape, cross-section, or profile or any other suitable shape, cross-section, profile, or combination thereof, such as a rectangle(s), polygon(s), cone(s), prism(s), etc. In additional or alternative embodiments, ventral-side longitudinal member 28 may be curved and/or configured to curve to complement a curvature or change in inclination of the ventral chest and/or torso of the animal, in use.

In some embodiments, the ventral-side longitudinal member 28 may be formed from a buoyant material (e.g., foam, an inflatable bladder, or the like). Alternatively and unlike the longitudinal members 24A, 24B, the ventral-side longitudinal member 28 may not be configured to act as a flotation device and/or may not be formed from or predominantly formed from a buoyant material. For example, the ventral-side longitudinal member 28 may define a density greater than or equal to water, may include unsealed cavities, or may be permeable in order to allow water to fill the ventral-side longitudinal member 28 when a water hazard is encountered.

Figure 4:
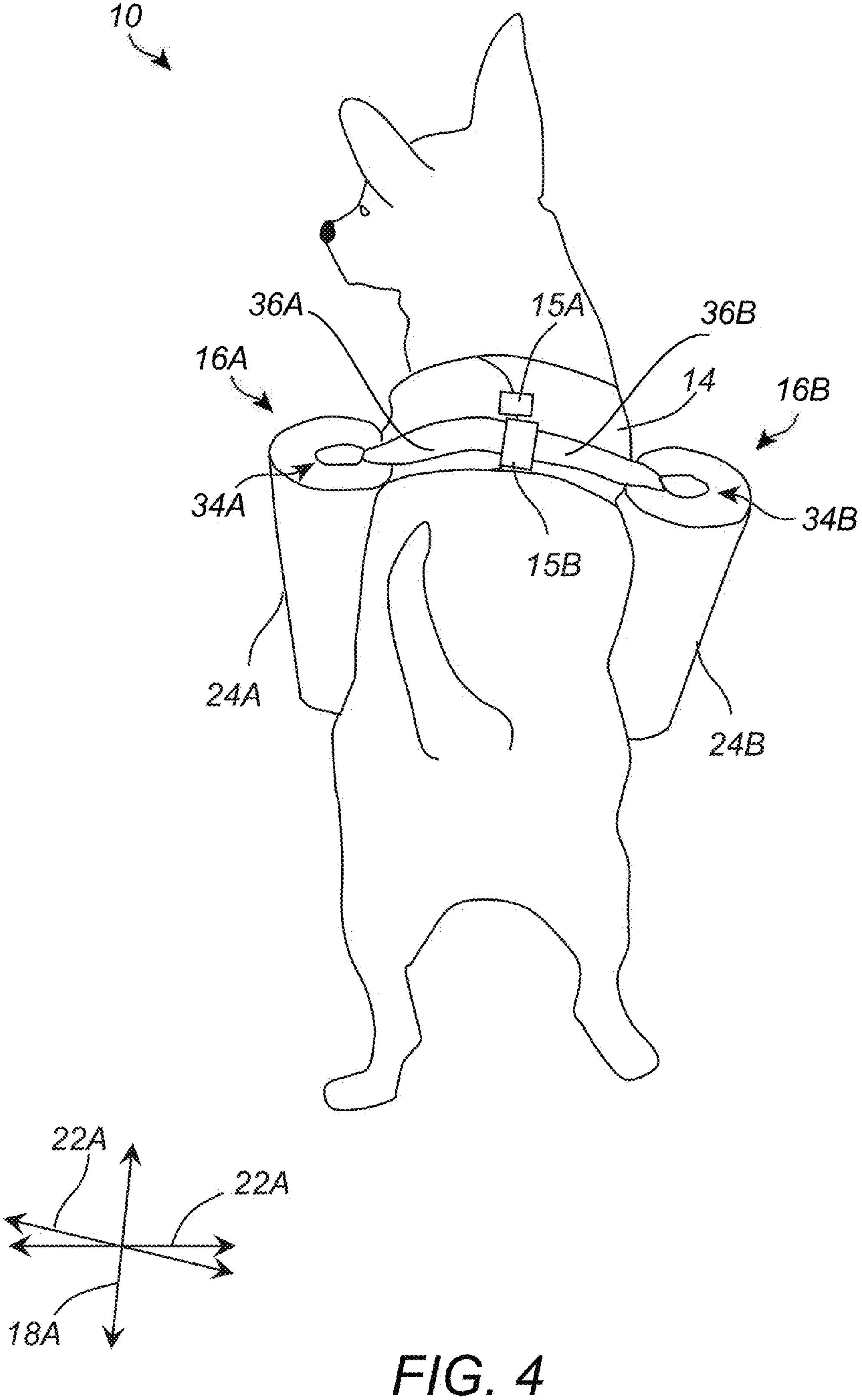
FIG. 4 illustrates a schematic back perspective view of an exemplary embodiment of a device for retaining an animal within an enclosure and in use, in accordance with aspects of the present subject matter.

Referring now to FIG. 4, a back perspective view of an exemplary embodiment of a device for retaining an animal is schematically illustrated in accordance with aspect of the present subject matter. Similar to the embodiment of FIG. 2 described above, second ends of retention straps 36A, 36B may each be secured to the harness 14 within each of the back portion of the harness 14, the bottom portion of the harness 14, and the respective left-side portion or right-side portion of the harness 14 and received within the cavity 34A, 34B of the respective cranial retainer 16A, 16B and/or respective longitudinal member 24A, 24B. Unlike the embodiment of FIG. 2, where the first ends of the retention straps 36A, 36B are separately secured to the harness 14 to secure the retainers 16A, 16B thereto, the first ends of the retention straps 36A, 36B may be selectively coupled together to secure the retainers 16A, 16B to the harness 14 and/or to secure the device 10 to the animal. For example, a closure 15B (e.g., a clasp, buckle, zipper, hook-and-loop fastener, or the like) may be configured to selectively couple the first ends of the retention straps 36A, 36B to secure the retainers 16A, 16B to the harness 14 and/or to the animal or to secure device 10 to the animal. It should be appreciated that the device 10 and/or harness 14 may optionally include one or more additional closures 15A, as described above.

Figure 5:
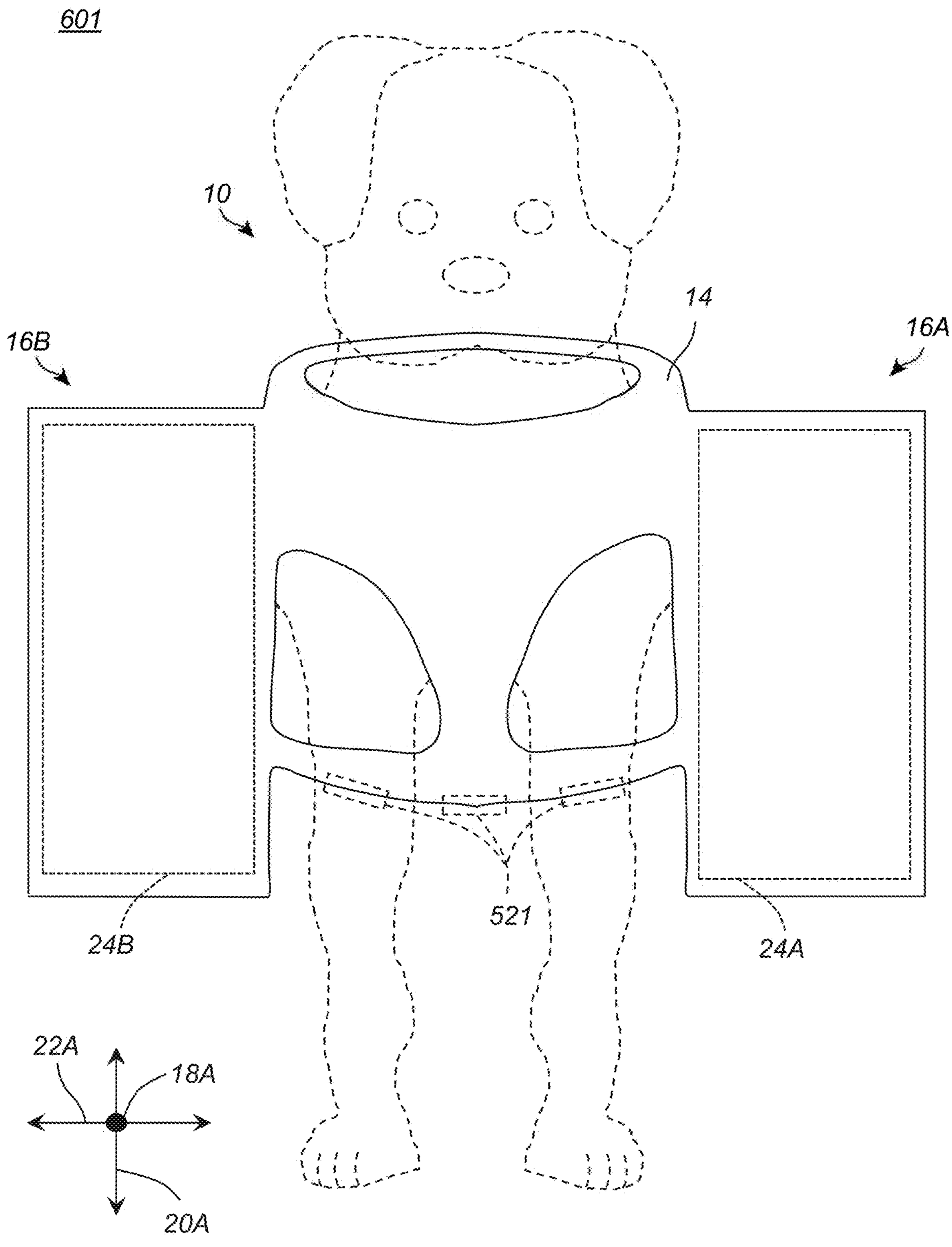
FIG. 5 illustrates a schematic front view of an exemplary embodiment of a device for retaining an animal within an enclosure and including embedded retainers, in accordance with aspects of the present subject matter.

Referring now to FIG. 5, a front schematic view of an exemplary embodiment of a device for retaining an animal including embedded retainers is illustrated in accordance with aspects of the present subject matter. As shown, the flexible material of the harness 14 (e.g., a fabric or a combination of fabrics) may enclose the left-side longitudinal member 24A and the right-side longitudinal member 24B to define the left-side cranial retainer 16A and the right-side cranial retainer 16B, respectively. For example, the flexible material(s) of the harness 14 may fully or partially enclose a material forming each of the longitudinal members 24A, 24B, such as foam, internal bladders, or the like. In some embodiments the harness 14 and/or a flexible material thereof may define one or more cavities, openings, or the like to receive the respective longitudinal members 24 and selectively close to secure the same within or to the harness 14. For example, openings on a cranial end of the harness 14 and/or a caudal end of the harness 14 may receive the respective longitudinal members 24 and be closed (e.g., buttoned, zipped, hook-and-loop fastened, or the like) to secure the longitudinal members 24 within or to the harness 14.

As further shown in FIG. 5 and in some embodiments, the harness 14 may include floater strips (see, e.g., strips 521 shown in phantom in FIG. 5) embedded in or coupled to the harness 14 to increase the buoyancy of the device 10. Such strips 521 may generally extend along the majority of the length of the harness 14 along the cranial-caudal axis 18A. Alternatively, multiple strips 521 may be arranged generally end to end along the cranial-caudal axis 18A. It should be appreciated that the device 10 and/or harness 14 may include additional or fewer strips 521 along the bottom portion of the harness 14 or strips 521 alternatively positioned or embedded with respect to the harness 14, e.g., the left-side portion and/or right-side portion of the harness 14.

Figure 6:
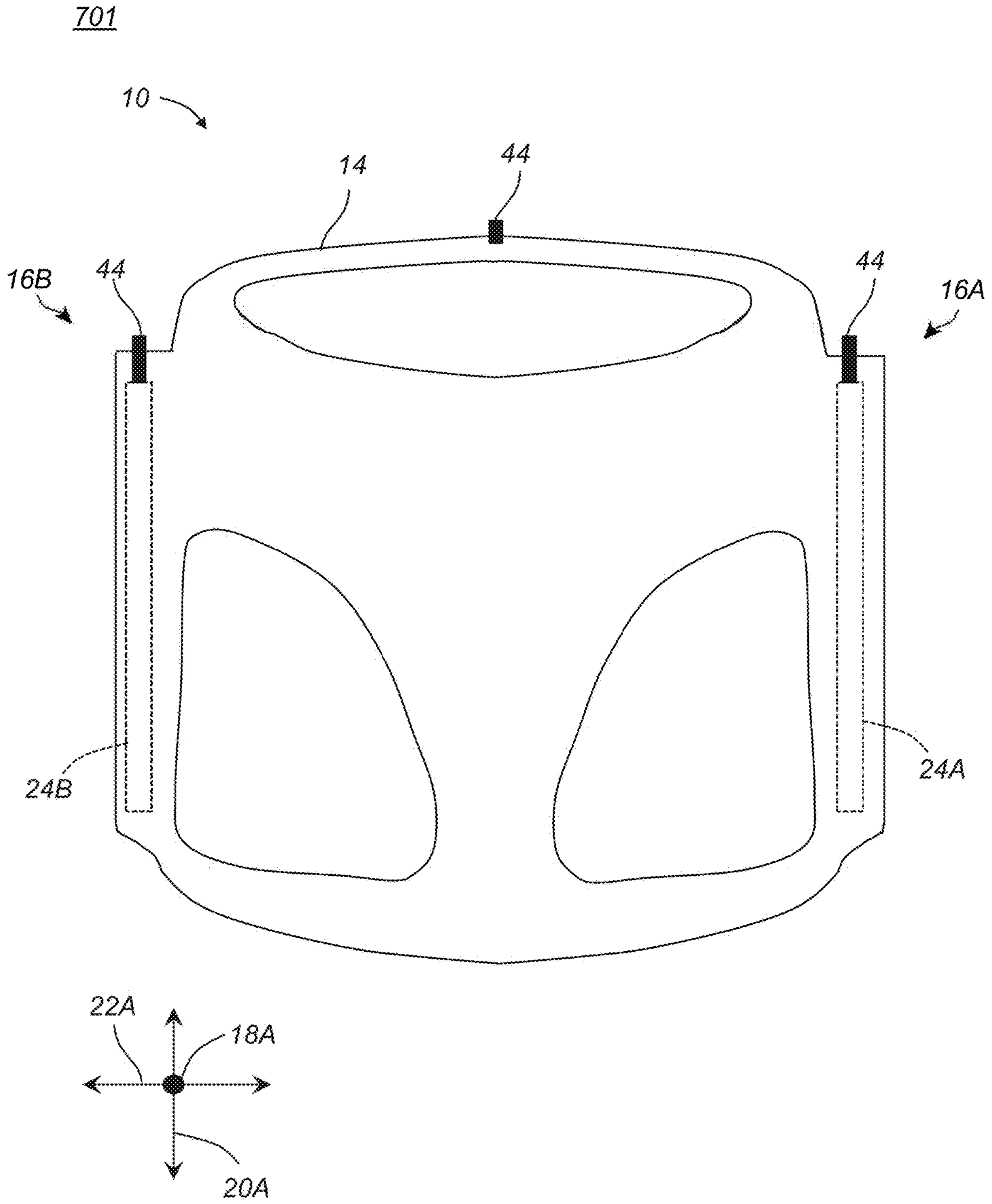
FIG. 6 illustrates a schematic front view of an exemplary embodiment of a device for retaining an animal within an enclosure and having embedded retainers including internal bladders, in accordance with aspects of the present subject matter.

Referring now also to FIG. 6, a front schematic view of an exemplary embodiment of a device for retaining an animal including internal bladders is illustrated in accordance with aspects of the present subject matter. As shown, the longitudinal members 24A, 24B may each be formed, at least in part, from a sealable, nonpermeable internal bladder. Once pressurized to a sufficient degree, the sealable, nonpermeable internal bladders expand and/or stiffen to form the longitudinal members 24A, 24B and/or the cranial retainers 16A, 16B, as shown in FIG. 5. For example, the device 10 and/or the cranial retainers 16A, 16B may include one or more ports, valves, or the like (ports 44 of FIG. 6)

suitable to allow the inflatable bladders to be selectively pressurized or depressurized. Furthermore and in some embodiments, the internal bladder of the left-side longitudinal member 24A may be fluidly coupled with the internal bladder of the right-side longitudinal member 24B. For example, connecting lines, conduits, or the like omitted from FIG. 6 may run between the internal bladders, such as along the harness 14 or embedded within the flexible material(s) thereof, to fluidly couple the internal bladders. In some such embodiments, one or more joint ports 44 may be provided to selectively pressurize or depressurize both internal bladders (see, e.g., top port 44 fluidly coupled to a connecting conduit, which is omitted from FIG. 6 for clarity). While illustrated as provided along the top portion of the device 10, harness 14, and/or cranial retainers 16, it should be appreciated that the port(s) 15 may additionally or alternatively be provided at the bottom portion(s), back portion(s), and/or side portion(s) of the device 10, the harness 14, and/or the cranial retainers 16.

Figure 7:
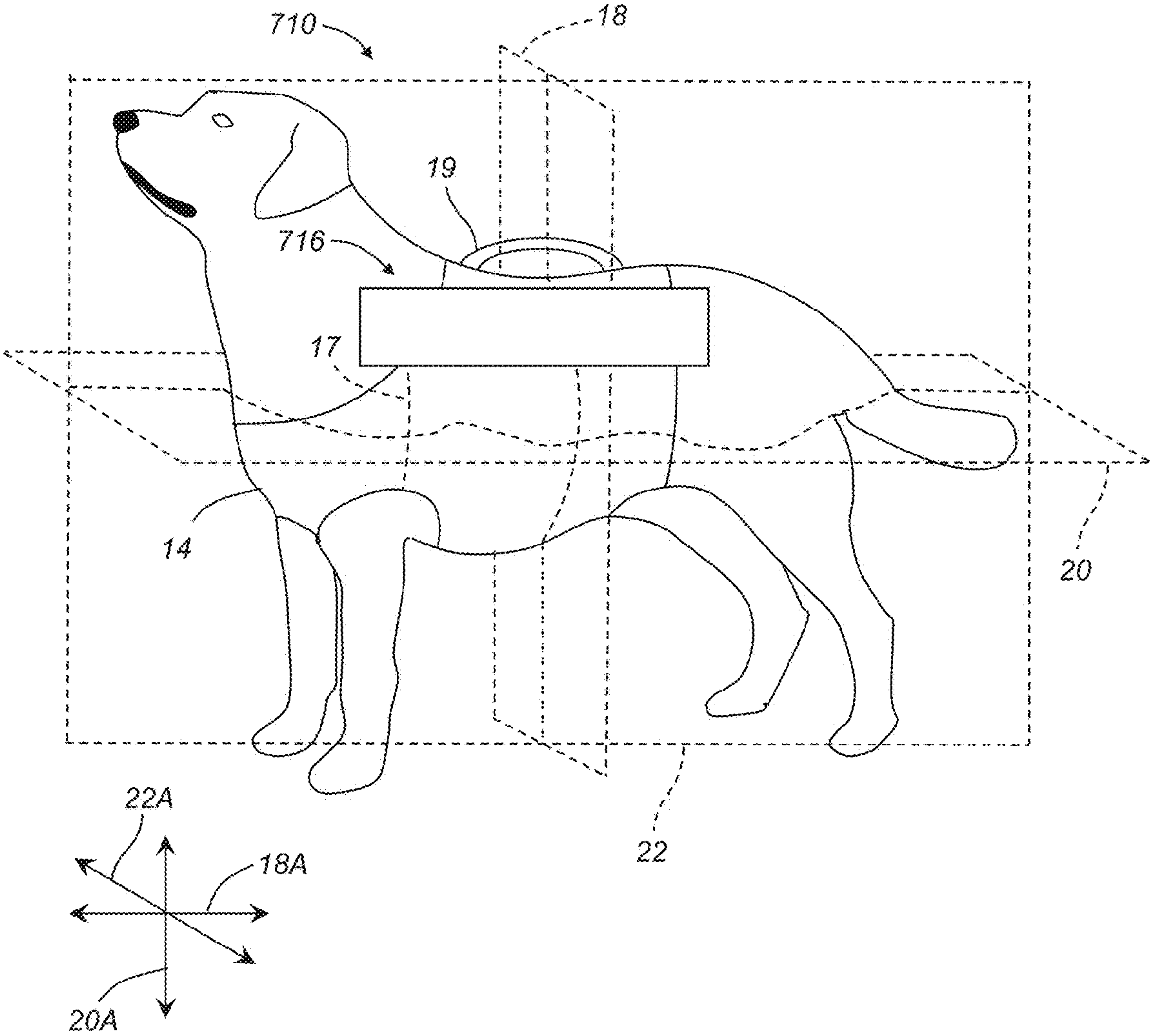
FIG. 7 illustrates a schematic diagram of an exemplary embodiment of another device for retaining an animal within an enclosure and including dorsal retainers, in accordance with aspects of the present subject matter.
Figure 8:
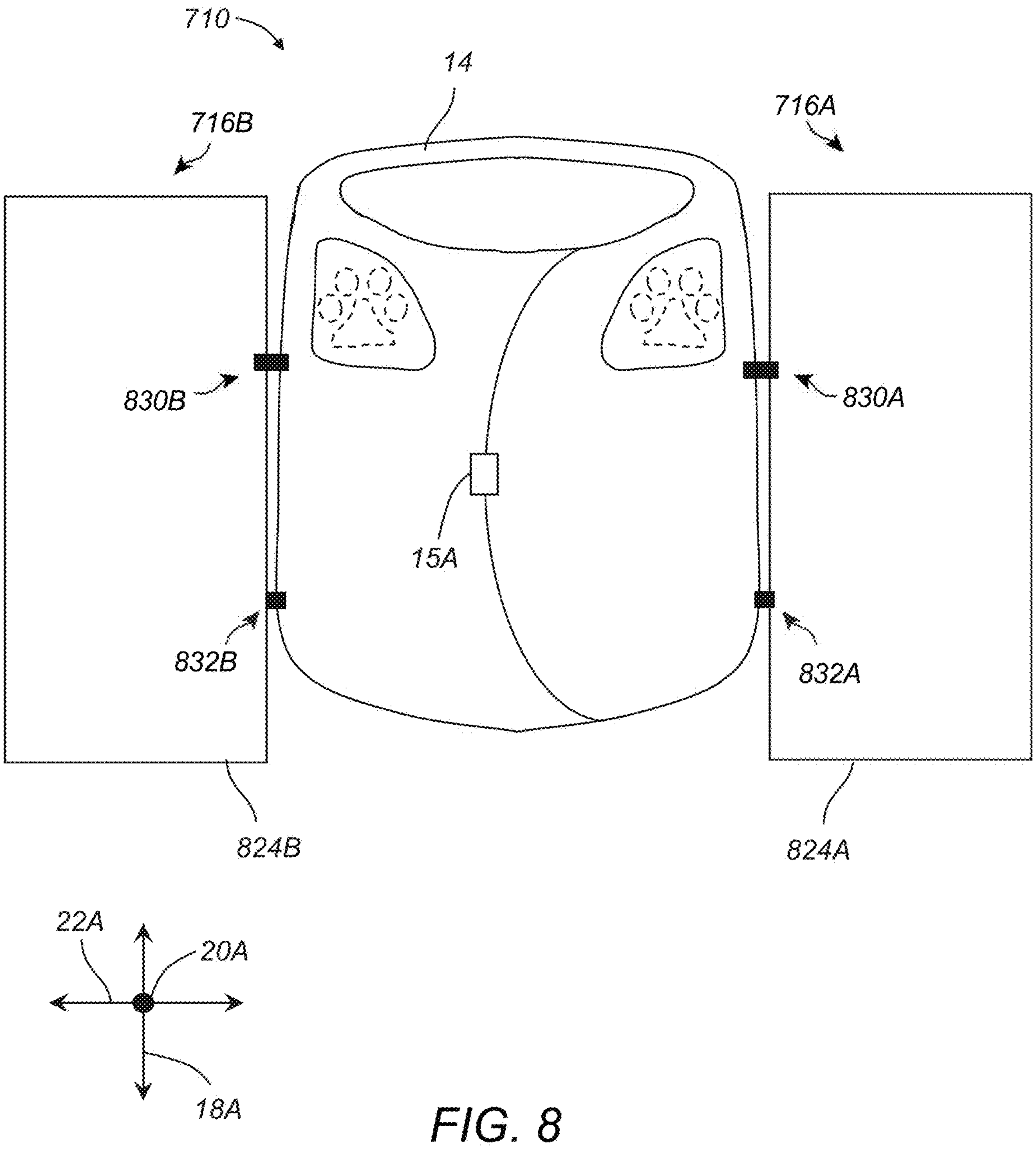
FIG. 8 illustrates a schematic bottom view of an exemplary embodiment of another device for retaining an animal within an enclosure and including dorsal retainers, in accordance with aspects of the present subject matter.

Referring now generally to FIGS. 7 and 8, schematic diagrams of exemplary embodiments of an additional or alternative device for retaining an animal within an enclosure are illustrated in accordance with aspects of the present subject matter. Particularly, FIG. 7 illustrates a perspective schematic view of a device including retainers configured as dorsal retainers, and FIG. 8 illustrates a bottom schematic view of a device including retainers configured as dorsal retainers. As shown, the device 710 may generally be configured as or similar to any of the embodiment of the devices 10 illustrated with respect to FIGS. 1-6. However, the retainers may be configured as dorsal retainers 716 (e.g., a left-side dorsal retainer 716A and a right-side dorsal retainer 716B as shown particularly in FIG. 8). In some embodiments of the device, the device may include a handle (see, e.g. handle 719 of FIG. 7) allowing the animal to be picked up, such as from a water hazard. It should be appreciated that any of the embodiments of device 10 may optionally also include such a handle.

Furthermore and as shown, the harness 14 may extend in the caudal direction along the cranial-caudal axis 18A past the cranial-caudal plane 18 to be selectively secured around at least one of the caudal torso or caudal leg of the animal in use and generally as described above (e.g., via the use of one or more closures 15). For the embodiment of the harness 14 illustrated in FIGS. 7 and 8, portions of the harness 14 forward of the cranial-caudal plane 18, in use, may define the front portion of the harness 14, with the remaining portions of the harness 14 aft of the cranial-caudal plane 18 defining the back portion of the harness 14. Additionally or alternatively, the front portion of the harness 14 may be defined by the front half of the harness 14 along the cranial-caudal axis 18A, and the back portion of the harness 14 may be defined by the back half of the harness 14 along the cranial-caudal axis 18A. As shown particularly in FIG. 8 and in some embodiments, one or more closure(s) 15A, such as one or more hook-and-loop fasteners, may be configured to selectively couple different portions of the harness 14 together within the bottom portion of the harness 14.

As shown, the device 710 includes a left-side dorsal retainer 716A coupled to the harness 14. The left-side dorsal retainer 716A includes a left-side longitudinal member 824A arranged such that a longitudinal axis of the left-side longitudinal member 824A is oriented parallel or substantially parallel to the cranial-caudal axis 18A of the animal in use. The device 710 also includes a right-side dorsal retainer 716B coupled to the harness 14. The right-side dorsal retainer 716B includes a right-side longitudinal member 824B arranged such that a longitudinal axis of the right-side longitudinal member 824B is oriented parallel or substantially parallel to the cranial-caudal axis 18A of the animal in use. The longitudinal axes of the longitudinal members 824A, 824B may be oriented substantially parallel to the cranial-caudal axis 18A due to the shape of the body of the animal. For instance, the sides of the torso and/or chest of the animal may be oriented in the lateral direction with respect to the lateral-medial plane 22 and/or the cranial-caudal axis 18A due to a rounded body. Thus, longitudinal axes of the longitudinal members 824A, 824B may be oriented within 20 degrees, such as within 10 degrees, such as within 5 degrees of the cranial-caudal axis 18A. Furthermore, such angle may be defined, at least in part, in a lateral direction with respect to the cranial-caudal axis 18A.

Each of the longitudinal members 824A, 824B may include or be formed from a buoyant material allowing the dorsal retainers 716A, 716B to function as floatation devices. For example, each of the longitudinal members 824A, 824B may include or be formed from a foam material; a permanently sealed, nonpermeable internal bladder; a sealable, nonpermeable internal bladder; or the like. The harness 14 and/or device 710 may optionally include one or more strips 521 and/or the ventral-side cranial retainer 26 as described above with respect to FIGS. 3 and 5, respectively.

As shown particularly in FIG. 8, each of the dorsal retainers 716A, 716B may be coupled to the harness 14 at a first location (830A or 830B of the respective left-side dorsal retainer 716A or right-side dorsal retainer 716B) within each of the front portion of the harness 14, the top portion of the harness 14, and the respective left-side portion or right-side portion of the harness 14. Each of the dorsal retainers 716A, 716B may be further coupled to the harness 14 at a second location (832A or 832B of the respective left-side dorsal retainer 716A or right-side dorsal retainer 716B) within each of the back portion of the harness 14, the bottom portion of the harness 14, and the respective left-side portion or right-side portion of the harness 14. As shown and in some embodiments, each of the dorsal retainers 716A, 716B may be discretely coupled to the harness 14 at the first location 830A, 830B and at the second location 832A, 832B. For example, each of the dorsal retainers 716A, 716B and/or the longitudinal members 824A, 824B may be stitched, glued, adhered, or otherwise fastened or attached (e.g., one or more hook and loop fasteners) to the harness 14 at each of the first location 830A, 830B and the second location 832A, 832B.

While omitted from FIGS. 7-8, each of the dorsal retainers 716A, 16B and/or the longitudinal members 824A, 824B may define a cavity associated with one or more retention straps for securing the dorsal retainers 716A, 716B to the harness 14, as described herein with respect to any of the embodiments of the device 10. Additionally or alternatively, each of the dorsal retainers 716A, 716B may be continuously coupled to the harness 14 from the first location 830A, 830B to the second location 832A, 832B such as via stitching or a continuous hook-and-loop fastener connection. In various embodiments, the longitudinal members 824A, 824 (e.g., foam, internal bladders, or the like) may be enclosed within the harness 14, such as via cavities or openings defined in the harness 14 or a flexible material thereof, as described herein. Particularly and in embodiments where the harness 14 extends along the cranial-caudal axis 18A in the caudal direction past the cranial-caudal plane 18, the caudal end of the harness 14 may include the openings to receive the longitudinal members 824A, 824B. In embodiments of the longitudinal members 824A, 824B configured as inflatable bladders, the device 710 and/or harness 14 may include any of the ports 15 described above with respect to FIG. 6. Particularly and in embodiments where the harness 14 extends along the cranial-caudal axis 18A in the caudal direction past the cranial-caudal plane 18, the caudal end of the harness 14 may include one or more or all of the port(s) 15.

The longitudinal members 824A, 824B may each define a widest width perpendicular to its respective longitudinal axis (e.g., along the lateral-medial axis 22A) in use. Furthermore, the longitudinal members 824A, 824B may each define a ratio of the widest width perpendicular to its respective longitudinal axis (and/or the widest width along the lateral-medial axis 22A) over the longitudinal length along the respective longitudinal axis between 0.48 and 0.88, such as between 0.53 and 0.83, such as between 0.58 and 0.78, such as between 0.63 and 0.73. Furthermore, the harness 14 may define a widest width in use, e.g., a widest width along the lateral-medial axis 22A. In some embodiments or different embodiments, a ratio of the widest width of each of the longitudinal members 824A, 824B (and/or the widest width along the lateral-medial axis 22A) over the widest width of the harness 14 may be 0.5 or more.

Although the present disclosure is illustrated and described with reference to embodiments and examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following, non-limiting Claims for all purposes.

What is claimed is:

1. A device for retaining an animal, the device comprising:

a harness comprising at least one flexible material, the harness configured to be selectively secured around a body of the animal;

a left-side cranial retainer coupled to the harness and comprising a left-side longitudinal member configured such that a longitudinal axis of the left-side longitudinal member is oriented substantially parallel to a dorsal-ventral axis of the animal in use, the left-side cranial retainer defining a cavity extending through the left-side longitudinal member and along the longitudinal axis of the left-side longitudinal member;

a right-side cranial retainer coupled to the harness and comprising a right-side longitudinal member configured such that a longitudinal axis of the right-side longitudinal member is oriented substantially parallel to the dorsal-ventral axis of the animal in use, the right-side cranial retainer defining a cavity extending through the right-side longitudinal member and along the longitudinal axis of the right-side longitudinal member;

a left-side retention strap received within the cavity defined through the left-side longitudinal member, the left-side retention strap including opposing ends each separately coupled to the harness; and a right-side retention strap received within the cavity defined through the right-side longitudinal member, the right-side retention strap including opposing ends each separately coupled to the harness.

2. The device of claim 1, further comprising:

a ventral-side cranial retainer coupled to the harness and comprising a ventral-side longitudinal member configured such that a longitudinal axis of the ventral-side longitudinal member is oriented substantially perpendicular to a lateral-medial axis of the animal in use.

3. The device of claim 2, wherein the longitudinal axis of the ventral side longitudinal member of the ventral-side cranial retainer is oriented predominantly along a cranial-caudal axis of the animal in use.

4. The device of claim 1, wherein the harness is configured to define a front portion opposite a back portion, a top portion opposite a bottom portion, and a left-side portion opposite a right-side portion, and wherein each of the left-side cranial retainer and the right-side cranial retainer is coupled to the harness at a location within each of the back portion of the harness, the top portion of the harness, and the respective left-side portion or right-side portion of the harness.

5. The device of claim 4, wherein each of the left-side cranial retainer and the right-side cranial retainer is further coupled to the harness at a further location within each of the back portion of the harness, the bottom portion of the harness, and the respective left-side portion or right-side portion of the harness.

6. The device of claim 5, wherein each of the left-side cranial retainer and the right-side cranial retainer is continuously coupled to the harness from the respective location to the respective further location.

7. The device of claim 5, wherein a geometric center of each of the left-side cranial retainer and the right-side cranial retainer is positioned within each of the back portion of the harness, the bottom portion of the harness, and the respective left-side portion or right-side portion of the harness.

8. The device of claim 1, wherein each of the left-side longitudinal member and the right-side longitudinal member comprises a foam material.

9. The device of claim 1, wherein each of the left-side cranial retainer and the right-side cranial retainer is embedded within the harness.

10. The device of claim 9, wherein each of the left-side longitudinal member and the right-side longitudinal member comprises a sealable, nonpermeable internal bladder.

11. The device of claim 10, wherein the internal bladder of the left-side longitudinal member is fluidly coupled with the internal bladder of the right-side longitudinal member.

12. The device of claim 1, wherein each of the left-side longitudinal member and the right-side longitudinal member defines a longitudinal length of at least four inches along its respective longitudinal axis.

13. The device of claim 1, wherein each of the left-side longitudinal member and the right-side longitudinal member defines a longitudinal length greater than a height of the harness, in use.

14. The device of claim 1, wherein each of the left-side longitudinal member and the right-side longitudinal member defines a ratio of a widest width perpendicular to the respective longitudinal axis over a longitudinal length along the respective longitudinal axis between 0.48 and 0.88.

15. A device for retaining an animal, the device comprising:

a harness comprising at least one flexible material, the harness configured to be selectively secured around a body of the animal;

a left-side cranial retainer coupled to the harness and comprising a left-side longitudinal member configured such that a longitudinal axis of the left-side longitudinal member is oriented substantially parallel to a dorsal-ventral axis of the animal in use, the left-side cranial retainer defining a cavity extending through the left-side longitudinal member and along the longitudinal axis of the left-side longitudinal member;

a right-side cranial retainer coupled to the harness and comprising a right-side longitudinal member configured such that a longitudinal axis of the right-side longitudinal member is oriented substantially parallel to the dorsal-ventral axis of the animal in use, the right-side cranial retainer defining a cavity extending through the right-side longitudinal member and along the longitudinal axis of the right-side longitudinal member;

a left-side retention strap received within the cavity defined through the left-side longitudinal member, the left-side retention strap including a first end fixed to the harness and an opposing second end; and a right-side retention strap received within the cavity defined through the right-side longitudinal member, the right-side retention strap including a first end fixed to the harness and an opposing second end, wherein the second end of the right-side retention strap and the second end of the left-side retention strap are configured to selectively couple together to secure the animal to the device, in use.

16. A device for retaining an animal, a harness comprising at least one flexible material, the harness configured to be selectively secured around a body of the animal;

a left-side cranial retainer coupled to the harness and comprising a left-side longitudinal member configured such that a longitudinal axis of the left-side longitudinal member is oriented substantially parallel to a dorsal-ventral axis of the animal in use; and a right-side cranial retainer coupled to the harness and comprising a right-side longitudinal member configured such that a longitudinal axis of the right-side longitudinal member is oriented substantially parallel to the dorsal-ventral axis of the animal in use, wherein each of the left-side longitudinal member and the right-side longitudinal member extends vertically lower than a lowest point of the harness, in use.

* * * * *